United States Patent
Akazaki et al.

(10) Patent No.: US 9,587,612 B2
(45) Date of Patent: Mar. 7, 2017

(54) IN-CYLINDER PRESSURE DETECTING DEVICE OF DIRECT INJECTION TYPE INTERNAL COMBUSTION ENGINE

(75) Inventors: Shusuke Akazaki, Wako (JP); Yuji Yamamoto, Wako (JP); Toshitaka Hachiro, Tochigi (JP); Gaku Sato, Tochigi (JP)

(73) Assignees: HONDA MOTOR CO., LTD., Tokyo (JP); KEIHIN CORPORATION, Tokyo (JP)

( * ) Notice: Subject to any disclaimer, the term of this patent is extended or adjusted under 35 U.S.C. 154(b) by 461 days.

(21) Appl. No.: 13/985,143

(22) PCT Filed: Feb. 20, 2012

(86) PCT No.: PCT/JP2012/053959
§ 371 (c)(1),
(2), (4) Date: Oct. 25, 2013

(87) PCT Pub. No.: WO2012/115036
PCT Pub. Date: Aug. 30, 2012

(65) Prior Publication Data
US 2014/0048041 A1 Feb. 20, 2014

(30) Foreign Application Priority Data

Feb. 25, 2011 (JP) .................. 2011-039719

(51) Int. Cl.
*F02M 69/00* (2006.01)
*F02D 35/02* (2006.01)
(Continued)

(52) U.S. Cl.
CPC ........... *F02M 69/00* (2013.01); *F02B 23/104* (2013.01); *F02D 35/023* (2013.01);
(Continued)

(58) Field of Classification Search
CPC ...... F02D 41/30; F02D 35/023; F02D 35/027; F02D 19/061; F02D 19/0689;
(Continued)

(56) References Cited

U.S. PATENT DOCUMENTS 4,686,861 A * 8/1987 Morii ........................ G01L 1/16
310/338
4,896,642 A * 1/1990 Washino ............... F02D 35/023
123/406.42
(Continued)

FOREIGN PATENT DOCUMENTS

CN 1731116 A 2/2006
CN 101550898 A 10/2009
(Continued)

OTHER PUBLICATIONS

Chinese Office Action application No. 201280009218.2 dated Nov. 27, 2014.
(Continued)

*Primary Examiner* — Hung Q Nguyen
*Assistant Examiner* — John Bailey
(74) *Attorney, Agent, or Firm* — Squire Patton Boggs (US) LLP

(57) ABSTRACT

An in-cylinder pressure detecting device of a direct injection type internal combustion engine is provided in which a ring-shaped pressure detection element (34) surrounding a fuel injection hole (33*b*) is provided in the vicinity of an extremity of an injector (20) that injects fuel into a combustion chamber. Since the pressure detection element is provided on the injector, not only is it unnecessary to change the shape or structure of the cylinder head or the combustion chamber in order to provide the pressure detection element, but it is also possible to cool the pressure detection element (34) by fuel passing through the inside of the injector to thus
(Continued)

enhance the precision of pressure detection and the durability. Further, since the ring-shaped pressure detection element (34) surrounds the periphery of the fuel injection hole (33*b*), it is possible to maximize the dimensions of the pressure detection element (34) to thus further enhance the precision of pressure detection while avoiding interference between the pressure detection element (34) and fuel injected via the fuel injection hole (33*b*).

15 Claims, 11 Drawing Sheets

(51) Int. Cl.
*F02M 57/00* (2006.01)
*F02B 23/10* (2006.01)
*G01L 23/10* (2006.01)
*F02M 61/14* (2006.01)
*F02B 75/12* (2006.01)

(52) U.S. Cl.
CPC .......... *F02M 57/005* (2013.01); *F02M 61/14* (2013.01); *G01L 23/10* (2013.01); *F02B 2075/125* (2013.01); *F02M 2200/247* (2013.01); *Y02T 10/123* (2013.01); *Y02T 10/125* (2013.01)

(58) Field of Classification Search
CPC ............. F02D 2041/389; F02D 35/028; F02D 41/2467; F02M 21/0248; F02M 2200/247; F02M 25/0227; F02M 51/0603; F02M 55/004; F02M 57/005; F02P 13/00
USPC .... 123/435, 445; 73/114.39, 114.16, 114.17, 73/114.18, 114.19, 114.21
See application file for complete search history.

(56) References Cited

U.S. PATENT DOCUMENTS

| | | | | |
|---|---|---|---|---|
| 4,928,653 A * | 5/1990 | Ohkubo | ................ | F02D 35/023 123/435 |
| 5,027,775 A * | 7/1991 | Iwata | .................... | F02D 35/023 123/406.21 |
| 5,116,356 A * | 5/1992 | Ohkubo | ................ | F02D 35/023 123/406.43 |
| 5,499,607 A * | 3/1996 | Tomisawa | ............. | F02D 35/023 123/435 |
| 5,988,142 A * | 11/1999 | Klopfer | ................ | F02M 47/027 123/446 |
| 6,155,212 A | 12/2000 | McAllster | | |
| 6,289,876 B1 * | 9/2001 | Mackert | ............... | F02M 57/025 123/470 |
| 6,622,549 B1 * | 9/2003 | Wlodarczyk | ......... | F02D 35/022 73/114.16 |
| 7,000,596 B2 * | 2/2006 | Zurloye | .................... | F02B 1/12 123/299 |
| 7,896,257 B2 * | 3/2011 | Yan | ...................... | F02M 47/027 123/446 |
| 8,224,554 B2 * | 7/2012 | Kondo | ................ | F02M 57/005 123/456 |
| 8,260,531 B2 * | 9/2012 | Yasuda | ................. | F02D 35/023 123/435 |
| 8,444,060 B2 * | 5/2013 | Yan | ...................... | F02M 65/003 239/5 |
| 8,469,006 B2 * | 6/2013 | Cooke | .................. | F02M 51/005 123/478 |
| 8,600,644 B2 * | 12/2013 | Verner | ................ | F02D 41/2474 123/435 |
| 8,919,186 B2 * | 12/2014 | Kondo | ................. | F02M 47/027 73/114.51 |
| 9,309,850 B2 * | 4/2016 | Akazaki | ................. | F02M 61/14 |
| 2006/0170909 A1 * | 8/2006 | Wlodarczyk | ......... | F02D 35/022 356/225 |
| 2007/0039592 A1 | 2/2007 | Kull | | |
| 2009/0248276 A1 * | 10/2009 | Kondo | ................. | F02M 57/005 701/103 |
| 2010/0050991 A1 * | 3/2010 | Cooke | .................. | F02M 51/005 123/470 |
| 2010/0252001 A1 * | 10/2010 | Morita | ................. | F02M 51/005 123/472 |
| 2010/0263633 A1 * | 10/2010 | Kondo | ................. | F02M 47/027 123/478 |
| 2010/0294242 A1 * | 11/2010 | Kondo | ................. | F02M 47/027 123/470 |
| 2011/0006130 A1 * | 1/2011 | Kondo | ................. | F02M 47/027 239/71 |
| 2013/0338906 A1 * | 12/2013 | Akazaki | .............. | F02D 41/3005 701/105 |
| 2015/0059699 A1 * | 3/2015 | Sato | ....................... | F02M 61/14 123/435 |

FOREIGN PATENT DOCUMENTS

| | | | | |
|---|---|---|---|---|
| CN | 101691851 A | 4/2010 | | |
| DE | 33 07 109 A1 | 3/1984 | | |
| DE | 33 29 379 A1 | 2/1985 | | |
| DE | 196 22 651 A1 | 12/1996 | | |
| GB | 2 145 153 A | 3/1985 | | |
| GB | EP 0995901 A1 * | 4/2000 | ............. | F02M 47/00 |
| JP | 05-248977 A | 9/1993 | | |
| JP | 09-53483 A | 2/1997 | | |
| JP | 2000-85124 A | 3/2000 | | |
| JP | 2000-180286 A | 6/2000 | | |
| JP | 2001-527183 A | 12/2001 | | |
| JP | 2002-168718 A | 6/2002 | | |
| JP | 2002-243571 A | 8/2002 | | |
| JP | 2006-510888 A | 3/2006 | | |
| JP | 2006-527321 A | 11/2006 | | |
| JP | 2010-265790 A | 11/2010 | | |
| WO | 98/35210 A1 | 8/1998 | | |
| WO | 2004/015385 A1 | 2/2004 | | |
| WO | 2004/083623 A1 | 9/2004 | | |

OTHER PUBLICATIONS

Chinese Office Action dated May 29, 2014, issued in corresponding Chinese Application No. CN201280009218.2.
International Search Report mailed Mar. 27, 2012 issued in corresponding International Application No. PCT/JP2012/053959.
Supplementary European Search Report application No. EP 12 74 9964 dated Aug. 27, 2014.
Japan Patent Office, Office Action for corresponding Japanese Patent Application No. 2013-501024, Mar. 30, 2016.

* cited by examiner

IN-CYLINDER PRESSURE DETECTING DEVICE OF DIRECT INJECTION TYPE INTERNAL COMBUSTION ENGINE

TECHNICAL FIELD

The present invention relates to an in-cylinder pressure detecting device of a direct injection type internal combustion engine in which an in-cylinder pressure of a direct injection type internal combustion engine equipped with an injector for injecting fuel into a combustion chamber is detected using a pressure detection element.

BACKGROUND ART

An in-cylinder pressure detection device in which a projection is provided on a reverse face of a metal diaphragm provided at the extremity of an in-cylinder pressure sensor facing a combustion chamber of an internal combustion engine, and a load due to deformation of the metal diaphragm is transmitted to a pressure detection element via the projection is known from Patent Document 1 below.

Furthermore, an in-cylinder pressure detection device in which a piezoelectric element is provided on an inner wall face of a cylinder head facing a combustion chamber of an internal combustion engine, at the extremity of a glow plug or a spark plug facing the combustion chamber, or at the extremity of an injector facing the combustion chamber, and an in-cylinder pressure is detected based on a voltage generated due to deformation of the piezoelectric element is known from Patent Document 2 below.

RELATED ART DOCUMENTS

Patent Documents

Patent Document 1: Japanese Patent Application Laid-open No. 2000-180286
Patent Document 2: International Patent Application Laid-open No. WO2004/015385

SUMMARY OF INVENTION

Problems to be Solved by the Invention

The arrangement disclosed in Patent Document 1 above has the possibility that, since the in-cylinder pressure sensor is exposed directly to the high temperature of the combustion chamber, the heat will cause an increase in the temperature of the pressure detection element to thus degrade the precision of pressure detection or the durability.

Furthermore, among those described in Patent Document 2 above, an arrangement in which the piezoelectric element is provided at the extremity of the injector facing the combustion chamber enables the piezoelectric element to be cooled by means of fuel passing through the injector to thus prevent any increase in the temperature, but when the piezoelectric element is provided on an outer face of the injector, which has a fine extremity, there is the problem that the dimensions of the piezoelectric element become small and the precision of pressure detection is degraded and, furthermore, when the piezoelectric element is provided on an inner face of a fuel passage of the extremity of the injector or an outer face of a needle fitted into the fuel passage, there are also the problems that not only do the dimensions of the piezoelectric element become small thus degrading the precision of pressure detection, but also the flow of fuel within the fuel passage is affected by the piezoelectric element.

The present invention has been achieved in light of the above-mentioned circumstances, and it is an object thereof to provide an in-cylinder pressure detecting device of a direct injection type internal combustion engine that enables an in-cylinder pressure to be detected with a simple structure and good precision and that has excellent durability.

Means for Solving the Problems

In order to attain the above object, according to a first aspect of the present invention, there is provided an in-cylinder pressure detecting device of a direct injection type internal combustion engine in which a pressure detection element surrounding a fuel injection hole is provided in the vicinity of an extremity of an injector that injects fuel via the fuel injection hole into a combustion chamber of the direct injection type internal combustion engine, and the pressure detection element faces the combustion chamber.

Further, according to a second aspect of the present invention, in addition to the first aspect, a seal member that prevents a passage of combustion gas between an outer periphery of the injector and an inner periphery of an injector mounting hole of a cylinder head is provided in the vicinity of the extremity of the injector, and an output signal transmission member extending from the pressure detection element is disposed between an outer face of the injector and an inner face of the seal member.

Furthermore, according to a third aspect of the present invention, in addition to the second aspect, a collar structure that supports the seal member is provided in the vicinity of the extremity of the injector, and the collar structure is positioned between the seal member and the output signal transmission member.

Moreover, according to a fourth aspect of the present invention, in addition to the third aspect, the external diameter of the collar structure is larger than the external diameter of the pressure detection element.

Further, according to a fifth aspect of the present invention, in addition to the third or fourth aspect, an output signal transmission member housing groove, in which the output signal transmission member is disposed, is formed in the outer face of the injector.

Furthermore, according to a sixth aspect of the present invention, in addition to the first aspect, a seal member that prevents a passage of combustion gas between an outer periphery of the injector and an inner periphery of an injector mounting hole of a cylinder head is provided in an annular groove formed in the vicinity of the extremity of the injector, and the output signal transmission member extending from the pressure detection element is disposed in an interior of the injector.

Moreover, according to a seventh aspect of the present invention, in addition to the sixth aspect, an output signal transmission member housing hole, in which the output signal transmission member is disposed, is formed in the interior of the injector.

Further, according to an eighth aspect of the present invention, in addition to any one of the first to seventh aspects, a welding margin, with which the pressure detection element is integrally welded, is provided in the vicinity of the extremity of the injector.

Furthermore, according to a ninth aspect of the present invention, in addition to the eighth aspect, the welding margin is sandwiched between the pressure detection element and a valve seat member that is disposed on the inner periphery in the vicinity of the extremity of the injector and has the fuel injection hole formed therein, the welding margin being formed from a material having higher weldability than that of the valve seat member.

Moreover, according to a tenth aspect of the present invention, in addition to any one of the first to ninth aspects, a base end of the pressure detection element is an interference fit with the vicinity of the extremity of the injector, and an extremity of the pressure detection element is a clearance fit therewith.

Further, according to an eleventh aspect of the present invention, in addition to any one of the first to seventh aspects, the pressure detection element is formed integrally with the valve seat member.

Furthermore, according to a twelfth aspect of the present invention, in addition to the first aspect, a gasket that prevents a passage of combustion gas between an outer periphery of the injector and an inner periphery of an injector mounting hole of a cylinder head is provided on an intermediate part in an axial direction of the injector.

Moreover, according to a thirteenth aspect of the present invention, in addition to the twelfth aspect, an output signal transmission member extending from the pressure detection element is disposed in an interior of the injector.

Further, according to a fourteenth aspect, in addition to the twelfth aspect, an output signal transmission member extending from the pressure detection element is disposed between an inner face of the gasket and the outer face of the injector.

Effects of the Invention

In accordance with the first aspect of the present invention, since the ring-shaped pressure detection element surrounding the periphery of the fuel injection hole is provided in the vicinity of the extremity of the injector for injecting fuel via the fuel injection hole into the combustion chamber of the direct injection type internal combustion engine, it is possible to detect an in-cylinder pressure by making the pressure detection element face the combustion chamber. Since the pressure detection element is provided on the injector, not only is it unnecessary to change the shape or structure of the cylinder head or the combustion chamber in order to provide the pressure detection element, but it is also possible to block vibration of another cylinder, vibration of the valve operating mechanism, vibration of the head cover, etc. transmitted via the cylinder head to thus make it difficult for it to be transmitted to the pressure detection element. Furthermore, providing the pressure detection element on the injector, which is cooled by the passage of fuel, enables overheating of the pressure detection element to be suppressed and the precision of pressure detection and the durability to be enhanced. Moreover, since the ring-shaped pressure detection element surrounds the periphery of the fuel injection hole, it is possible to maximize the dimensions of the pressure detection element to thus further enhance the precision of pressure detection while avoiding interference between the pressure detection element and fuel injected via the fuel injection hole.

Furthermore, in accordance with the second aspect of the present invention, since the seal member is provided on the outer periphery in the vicinity of the extremity of the injector, it is possible to provide a seal between the injector and the inner periphery of the injector mounting hole of the cylinder head, thus preventing leakage of pressure. Since the output signal transmission member extending from the pressure detection element is disposed between the outer face of the injector and the inner face of the seal member, it is possible to prevent the sealing properties of the seal member from being impaired by the output signal transmission member.

Moreover, in accordance with the third aspect of the present invention, since the collar structure disposed between the seal member and the output signal transmission member is provided, it is possible to reliably fix the seal member, thus further improving the sealing properties, and it is possible to dispose the output signal transmission member on the inner peripheral face of the collar structure, thus making the machining of a space for disposing the output signal transmission member easy.

Furthermore, in accordance with the fourth aspect of the present invention, since the external diameter of the collar structure is larger than the external diameter of the pressure detection element, even if the position at which the pressure detection element is mounted in the vicinity of the extremity of the injector has a slight error, it is possible to prevent it from becoming difficult for the pressure detection element to be mounted due to interference with the inner periphery of the injector mounting hole of the cylinder head and to prevent the precision of pressure detection from being degraded by inhibition of free deformation of the pressure detection element.

Furthermore, in accordance with the fifth aspect of the present invention, since the output signal transmission member housing groove, in which the output signal transmission member is disposed, is formed in the outer face of the injector, it is possible to easily dispose the output signal transmission member and protect the output signal transmission member.

Moreover, in accordance with the sixth aspect of the present invention, since the seal member for preventing the passage of combustion gas between the outer periphery of the injector and the inner periphery of the injector mounting hole of the cylinder head is provided in the annular groove formed in the vicinity of the extremity of the injector, and the output signal transmission member extending from the pressure detection element is disposed in the interior of the injector, not only is it possible to prevent the passage of combustion gas by means of the seal member to thus prevent leakage of pressure, but it is also possible to prevent the sealing properties of the seal member from being impaired by the output signal transmission member and, moreover, to simplify the structure by supporting the seal member directly on the injector.

Furthermore, in accordance with the seventh aspect of the present invention, since the output signal transmission member housing hole, in which the output signal transmission member is disposed, is formed in the interior of the injector, it is possible to easily dispose the output signal transmission member and protect the output signal transmission member.

Moreover, in accordance with the eighth aspect of the present invention, since the welding margin for welding the pressure detection element integrally with the inner periphery in the vicinity of the extremity of the injector is provided, it is possible to minimize any adverse influence of the heat of welding on the pressure detection element.

Furthermore, in accordance with the ninth aspect of the present invention, if the valve seat member having the fuel injection hole formed therein is disposed on the inner periphery in the vicinity of the extremity of the injector, it might become difficult to weld the pressure detection element to the valve seat member depending on the material thereof, but since the welding margin sandwiched between the valve seat member and the pressure detection element is formed from a material having higher weldability than the valve seat member, it is possible to strongly weld the pressure detection element to the vicinity of the extremity of the injector via the welding margin.

Moreover, in accordance with the tenth aspect of the present invention, since the base end of the pressure detection element is an interference fit with the vicinity of the extremity of the injector and the extremity of the pressure detection element is a clearance fit therewith, it is possible to enhance the precision with which the pressure detection element is positioned relative to the vicinity of the extremity of the injector by means of the interference fit and to enable free deformation of the pressure detection element caused by the in-cylinder pressure by means of the clearance fit, thereby enhancing the precision of pressure detection.

Furthermore, in accordance with the eleventh aspect of the present invention, since the pressure detection element is formed integrally with the valve seat member, it is possible to cut the number of components and simplify the structure.

Moreover, in accordance with the twelfth aspect of the present invention, since the gasket for preventing the passage of combustion gas between the outer periphery of the injector and the inner periphery of the injector mounting hole of the cylinder head is provided on an intermediate part in the axial direction of the injector, it is also possible to ensure the sealing properties for combustion gas when the injector is applied to a diesel engine.

Furthermore, in accordance with the thirteenth aspect of the present invention, since the output signal transmission member extending from the pressure detection element is disposed in the interior of the injector, it is possible to prevent the sealing properties of the seal member from being impaired by the output signal transmission member and, moreover, to protect the output signal transmission member.

Furthermore, in accordance with the fourteenth aspect of the present invention, since the output signal transmission member extending from the pressure detection element is disposed between the inner face of the gasket and the outer face of the injector, it is possible to prevent the sealing properties of the seal member from being impaired by the output signal transmission member.

EXPLANATION OF REFERENCE NUMERALS AND SYMBOLS

Figure 1:
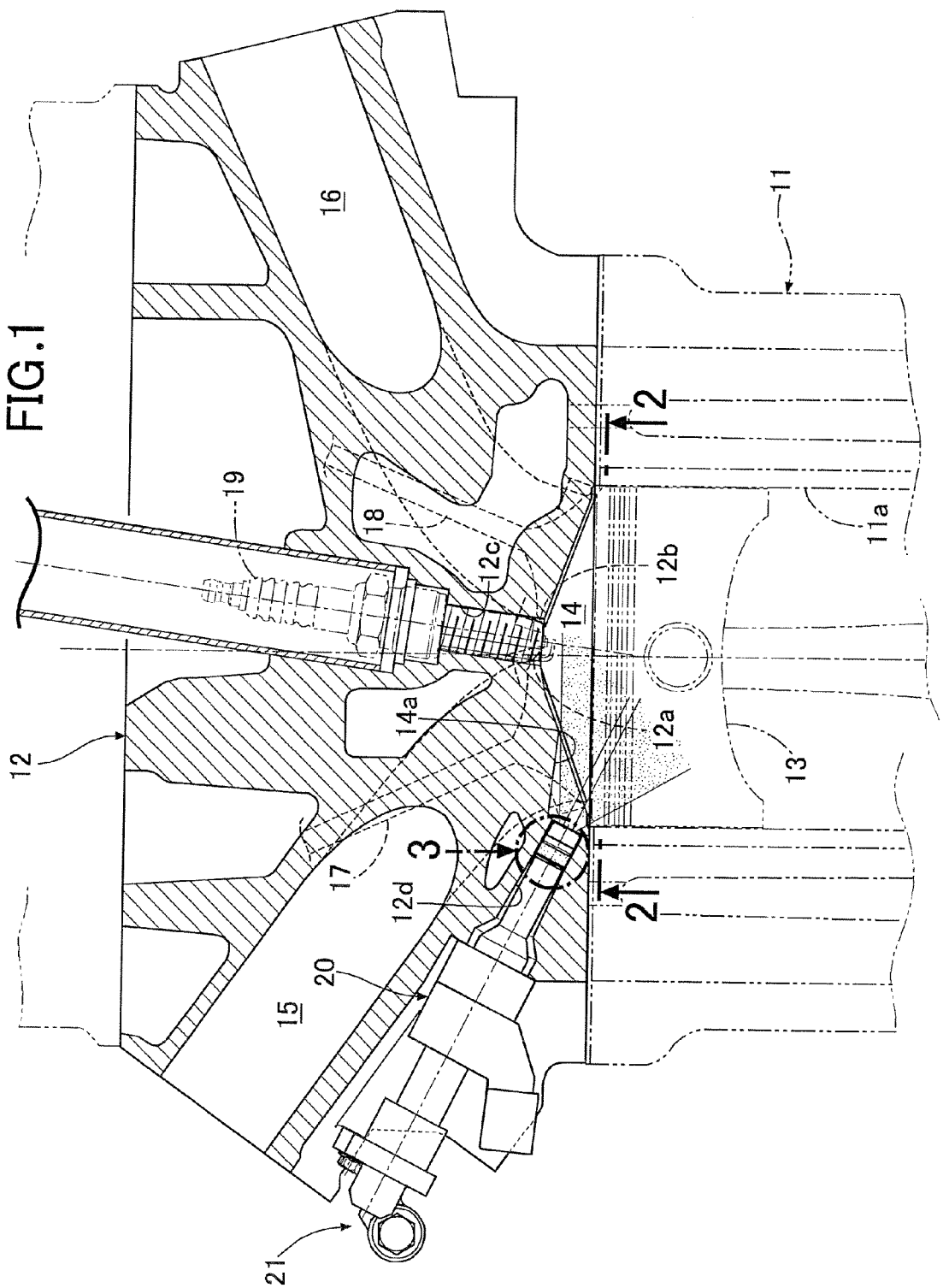
FIG. 1 is a vertical sectional view of a cylinder head of a direct injection type internal combustion engine. (first embodiment)

12 Cylinder head
12d Injector mounting hole
14 Combustion chamber
20 Injector
31e Welding margin
31f Output signal transmission member housing groove
31g Output signal transmission member housing hole
33 Valve seat member
33b Fuel injection hole
34 Pressure detection element
35 Collar structure
35a Annular groove
36 Seal member
48 Output signal transmission member
53 Gasket
A Interference fit
B Clearance fit

MODES FOR CARRYING OUT THE INVENTION

A first embodiment of the present invention is explained below by reference to FIG. 1 to FIG. 5.

First Embodiment

Figure 2:
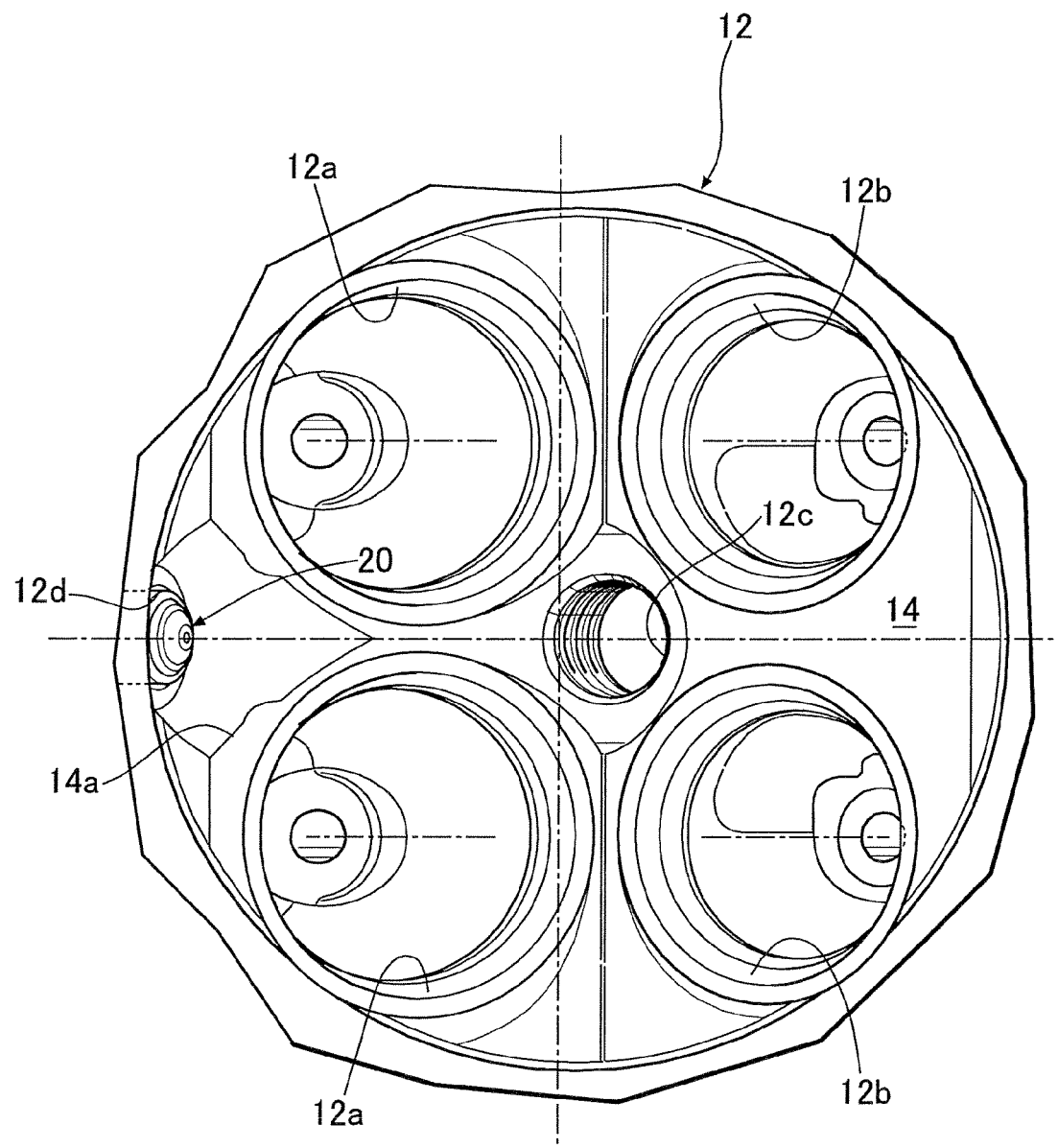
FIG. 2 is a view along arrowed line 2-2 in FIG. 1. (first embodiment)

As shown in FIG. 1 and FIG. 2, a cylinder head 12 is joined to an upper face of a cylinder block 11 of a direct injection type internal combustion engine, and a combustion chamber 14 is formed between an upper face of a piston 13 slidably fitted into a cylinder bore 11a and a lower face of the cylinder head 12. Two intake valve holes 12a and 12a communicating with an intake port 15 and two exhaust valve holes 12b and 12b communicating with an exhaust port 16 open in the combustion chamber 14, the two intake valve holes 12a and 12a being opened and closed by intake valves 17 and 17 respectively, and the two exhaust valve holes 12b and 12b being opened and closed by exhaust valves 18 and 18 respectively.

A spark plug 19 is mounted in a spark plug mounting hole 12c formed in a central part of the combustion chamber 14. Furthermore, a recess portion 14a is formed at a position sandwiched by the two intake valve holes 12a and 12a of the combustion chamber 14, and an injector 20 is mounted in an injector mounting hole 12d opening in the recess portion 14a. The injector 20 is connected to a delivery pipe 21 disposed along a side face on the intake side of the cylinder head 12, and the injector 20 injects fuel, supplied from the delivery pipe 21, into the interior of the combustion chamber 14.

The structure of the extremity of the injector 20 is now explained by reference to FIG. 3. In the present specification, the base side of the injector 20 is defined as denoting the delivery pipe 21 side and the extremity side of the injector 20 is defined as denoting the combustion chamber 14 side.

A cap-shaped valve seat member 33 is welded to the inner periphery of the extremity of a valve housing 31. Furthermore, a ring-shaped pressure detection element 34, which is a piezoelectric element, is welded to the outer periphery of the valve housing 31. Moreover, a tubular collar structure 35 is welded to the outer periphery of the valve housing 31 closer to the base side than the pressure detection element 34, and a seal member 36 fitted into an annular groove 35a formed on the outer periphery of the collar structure 35 provides a seal against the injector mounting hole 12d of the cylinder head 12. A stem 38 welded to a valve body 37 that can be seated on an inner face of the valve seat member 33 is connected to an actuator, which is not illustrated, and electromagnetically driven back and forth. Fuel from the delivery pipe 21 passes through a gap 46 between the valve housing 31 and the stem 38 and is supplied to the interior of the valve seat member 33.

A fuel injection hole 33b opens in the vicinity of a valve seat 33a formed on an inner face of the extremity of the valve seat member 33. The valve body 37, which is seated on the valve seat 33a to thus block the fuel injection hole 33b, is a spherical member and has a plurality of cutouts 37a formed on an outer peripheral face thereof, which is slidably guided by an inner peripheral face of the valve seat member 33, the plurality of cutouts 37a allowing fuel to pass through.

Figure 4:
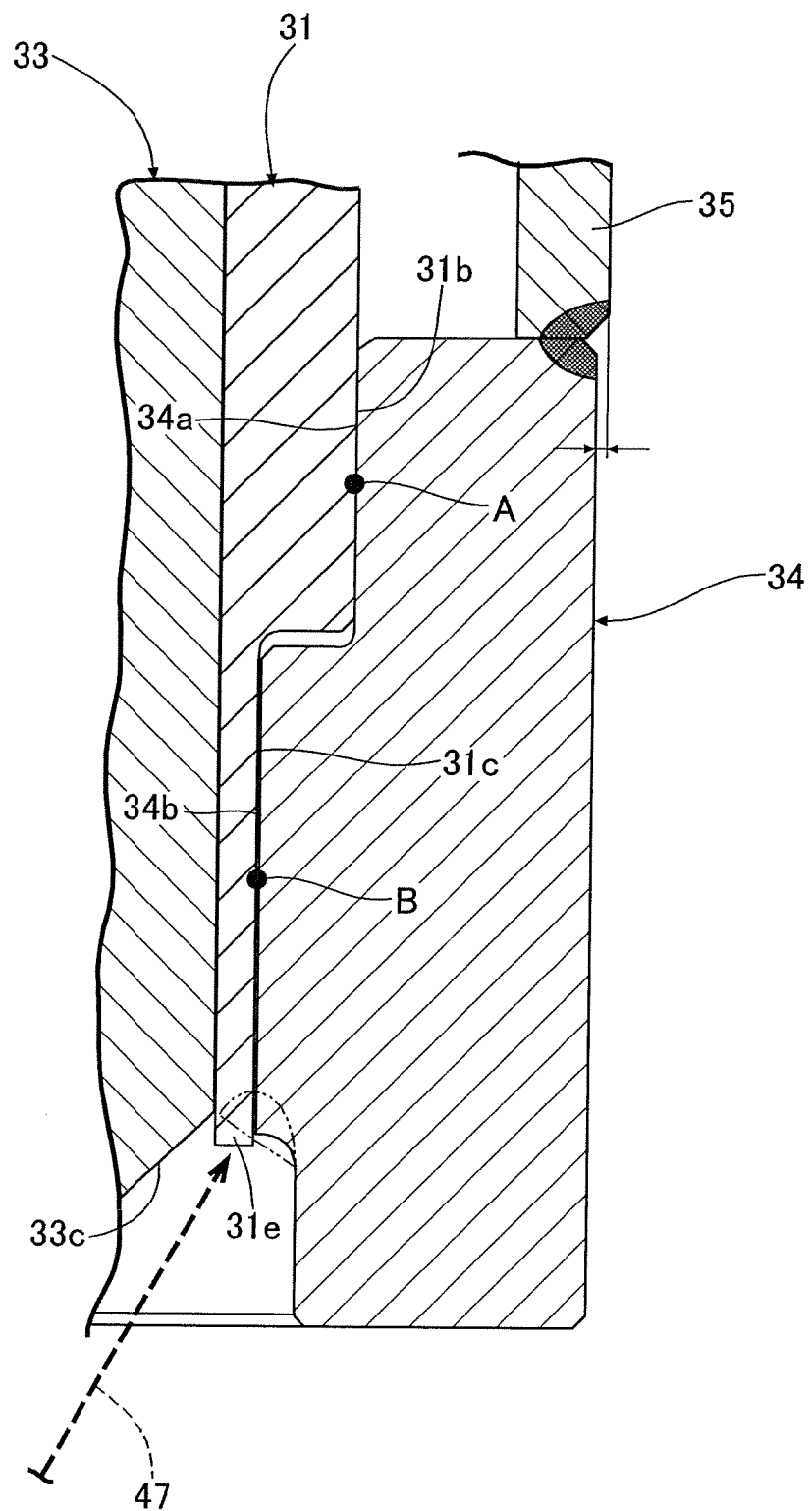
FIG. 4 is an enlarged view of part 4 in FIG. 3. (first embodiment)

As shown in FIG. 4, a large diameter portion 31b and a small diameter portion 31c are formed on an outer peripheral face of the extremity of the valve housing 31, a large diameter portion 34a of an inner peripheral face of the pressure detection element 34 is an interference fit A with the large diameter portion 31b of the valve housing 31, and a small diameter portion 34b of the inner peripheral face of the pressure detection element 34 is a clearance fit B with the small diameter portion 31c of the valve housing 31. While positioning with good precision the pressure detection element 34 relative to the valve housing 31 by means of the interference fit A, the clearance fit B allows the extremity of the pressure detection element 34 to undergo free compressive deformation due to in-cylinder pressure, thus enhancing the precision of pressure detection.

The collar structure 35, which is fitted around the outer periphery of the large diameter portion 31b of the valve housing 31, is held between a step portion 31d connectedly provided on the base side of the large diameter portion 31b and an end face on the base side of the pressure detection element 34. Sections where the pressure detection element 34 and the step portion 31d of the valve housing 31 abut against the collar structure 35 are welded, and a section where the inner periphery of the extremity of the pressure detection element 34 abuts against the extremity of the small diameter portion 34b of the valve housing 31 is welded, this enabling the pressure detection element 34 and the collar structure 35 to be fixed integrally to the valve housing 31.

As shown in FIG. 4, since the external diameter of the pressure detection element 34 is formed slightly smaller than the external diameter of the collar structure 35, even when the mounting position of the pressure detection element 34 relative to the valve housing 31 is displaced in the radial direction, it is possible to prevent the outer peripheral face of the pressure detection element 34 from protruding from the outer peripheral face of the collar structure 35. This makes it possible to prevent the pressure detection element 34 from making strong contact with the inner peripheral face of the injector mounting hole 12d, thereby preventing it from becoming difficult to insert the injector 20 into the injector mounting hole 12d and preventing free deformation of the pressure detection element 34 due to in-cylinder pressure from being inhibited to thus degrade the precision of pressure detection.

As shown in FIG. 4, when the inner periphery of the extremity of the pressure detection element 34 is welded to the extremity of the small diameter portion 31c of the valve housing 31, the extremity of the small diameter portion 31c of the valve housing 31 is made to protrude as a welding margin 31e, and carrying out welding by irradiating the welding margin 31e with a laser beam 47 can minimize the influence of the heat of laser welding on the pressure detection element 34, thereby preventing the precision of pressure detection from being degraded. In this arrangement, subjecting the outer periphery of the extremity of the valve seat member 33 to chamfering 33c can prevent the laser beam 47, with which the welding margin 31e is irradiated, from interfering with the valve seat member 33, and it is therefore possible to eliminate the possibility of damage to the valve seat member 33 and enhance the work efficiency.

The material of the pressure detection element 34 and the collar structure 35 is SUS304, which has good weldability, and the material of the valve housing 31 is SUS430, which has good weldability, but the material of the valve seat member 33 is SUS440C, which has poor weldability. Therefore, if the inner periphery of the pressure detection element 34 were to be welded directly to the outer periphery of the valve seat member 33, it would become necessary to increase the weld penetration of the pressure detection element 34, which has high weldability, and there would be the possibility that the precision of pressure detection of the pressure detection element 34 would be affected.

However, in accordance with the present embodiment, since the welding margin 31e of the valve housing 31, which has good weldability, is present between the valve seat member 33 and the pressure detection element 34, and the pressure detection element 34 and the valve housing 31 are welded by weld penetration of the welding margin 31e, the precision of pressure detection of the pressure detection element 34 will not be affected, and strong welding becomes possible.

Figure 3:
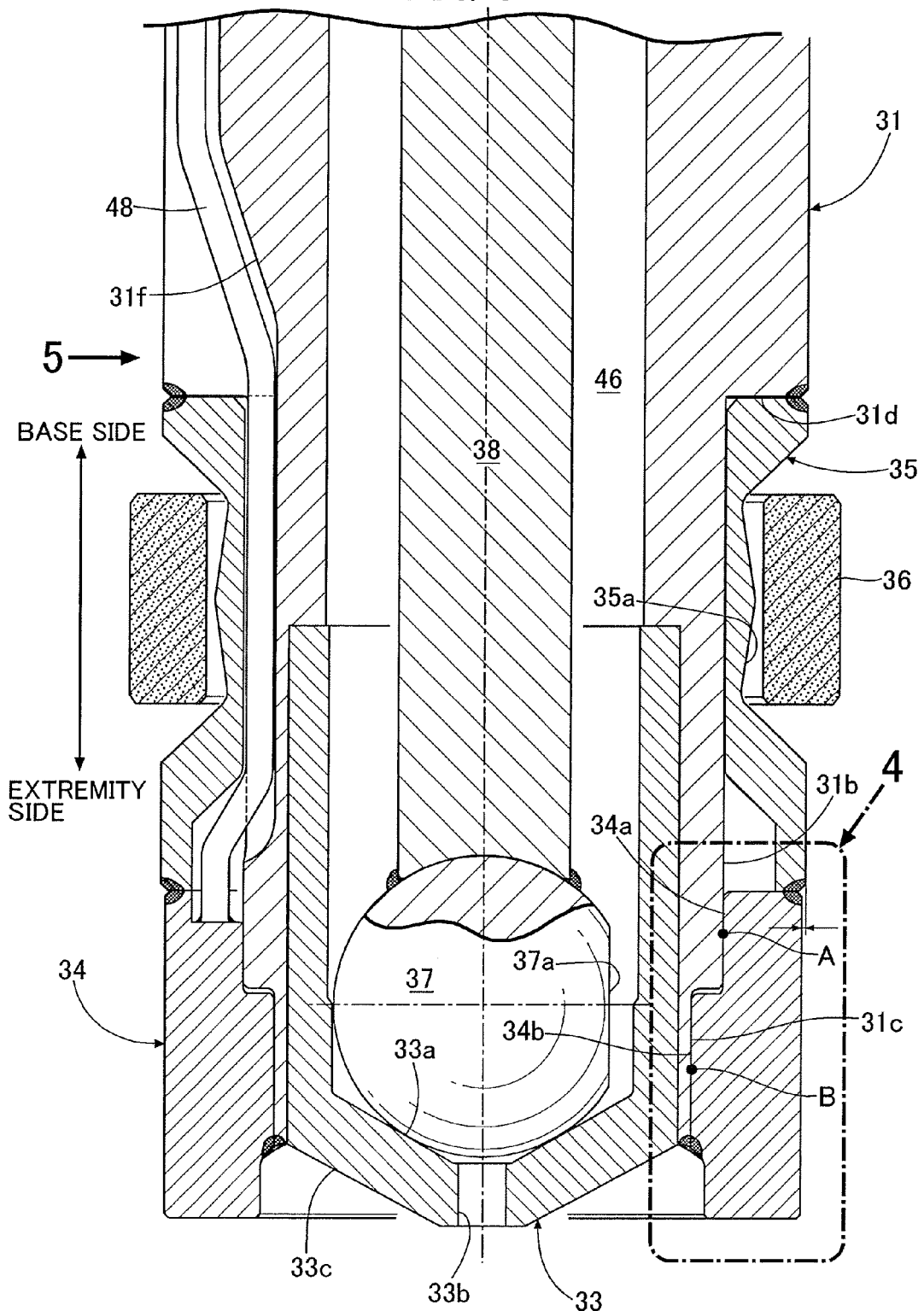
FIG. 3 is an enlarged view of part 3 in FIG. 1. (first embodiment)
Figure 5:
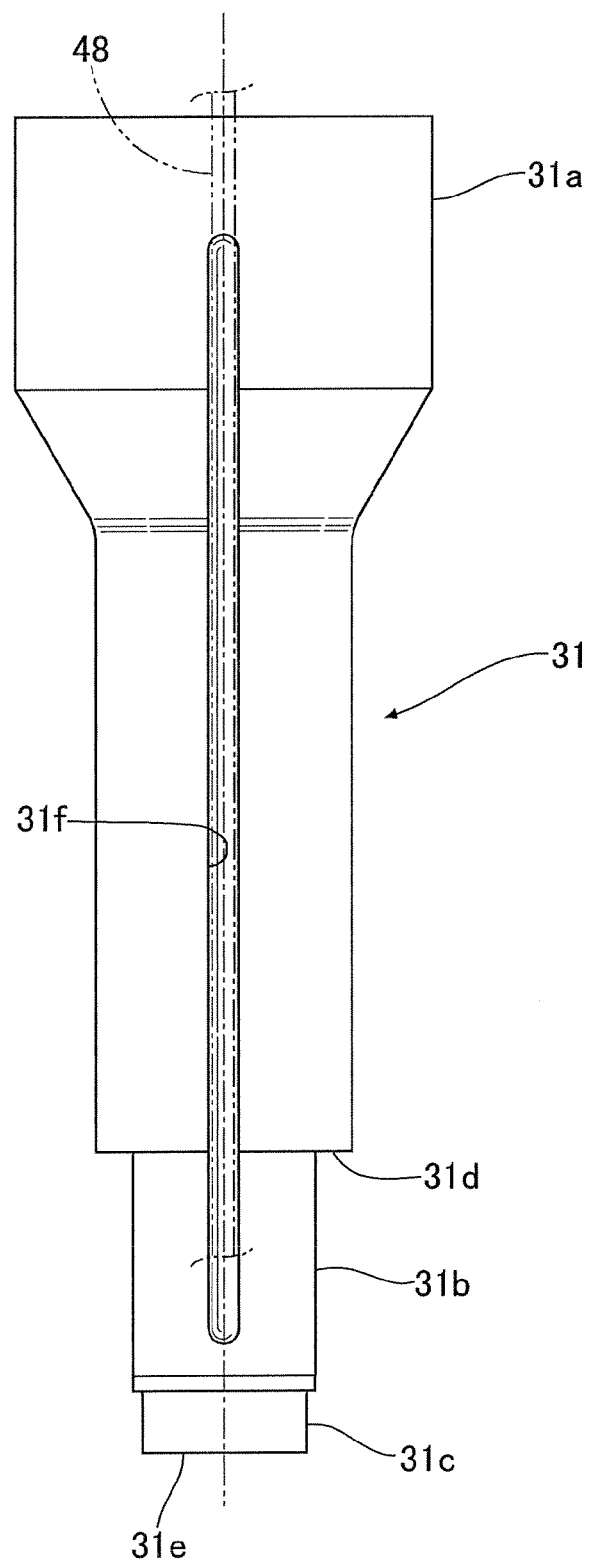
FIG. 5 is a view in the direction of arrow 5 in FIG. 3. (first embodiment)

As shown in FIG. 3 and FIG. 5, one output signal transmission member housing groove 31f is formed in the outer peripheral face of the valve housing 31 so as to extend in the axial direction from the large diameter portion 31b to a tubular portion 31a, and this output signal transmission member housing groove 31f houses an output signal transmission member 48 extending from the pressure detection element 34. Therefore, in a portion of the outer periphery of the large diameter portion 31b of the valve housing 31 around which the collar structure 35 is fitted, the output signal transmission member 48 housed in the output signal transmission member housing groove 31f passes through the inner peripheral side of the collar structure 35 and is pulled outside of the injector 20.

In this way, since the output signal transmission member 48 of the pressure detection element 34 passes through a tunnel-shaped passage formed from the output signal transmission member housing groove 31f on the inner peripheral side of the collar structure 35, the seal member 36 provided on the outer periphery of the collar structure 35 is prevented from interfering with the output signal transmission member 48, and the sealing properties of the seal member 36 are not degraded; since the collar structure 35 is formed from a member that is separate from the valve housing 31, the tunnel-shaped passage can be formed by simple machining, that is, merely forming the output signal transmission member housing groove 31f in the outer peripheral face of the valve housing 31.

Although the pressure of the combustion chamber 14 attempts to escape through the gap between the inner peripheral face of the injector mounting hole 12d of the cylinder head 12 and the outer peripheral faces of the pressure detection element 34 and the collar structure 35, leakage of the pressure is prevented by the seal member 36 fitted around the outer periphery of the collar structure 35. Furthermore, the pressure of the combustion chamber 14 attempts to escape through the gap between the outer peripheral face of the small diameter portion 31c of the valve housing 31 and the inner peripheral face of the pressure detection element 34 via the output signal transmission member housing groove 31f, but leakage of the pressure is prevented by welding of the welding margin 31e of the valve housing 31.

The operation of fuel injection of the injector 20 having the above arrangement is now explained.

In FIG. 3, when the valve body 37 welded to the stem 38 becomes detached from the valve seat 33a of the valve seat member 33, high pressure fuel supplied from a fuel pump, which is not illustrated, passes through the gap 46 between the valve housing 31 and the stem 38 and through the cutouts 37a on the outer periphery of the valve body 37, and is injected into the combustion chamber 14 via the fuel injection hole 33b of the valve seat member 33.

The operation of in-cylinder pressure detection by the pressure detection element 34 is now explained.

As shown in FIG. 1, since the pressure detection element 34 provided at the extremity of the injector 20 faces the recess portion 14a of the combustion chamber 14, the in-cylinder pressure acts on the extremity face of the pressure detection element 34 to thus compress the pressure detection element 34 in the axial direction, and a voltage corresponding to the amount of strain is outputted. The output voltage of the pressure detection element 34 is transmitted to an ECU, which is not illustrated, via the output signal transmission member 48, and the in-cylinder pressure is calculated from the voltage.

In this way, since the ring-shaped pressure detection element 34 surrounding the periphery of the fuel injection hole 33b of the valve seat member 33 is provided at the extremity of the injector 20, it becomes possible to detect an in-cylinder pressure merely by exchanging an injector 20 for an existing internal combustion engine without changing the shape or structure of the cylinder head 12 or the combustion chamber 14 in order to provide the pressure detection element 34, thus enabling any increase in cost to be suppressed to a very low level. Furthermore, since the pressure detection element 34 is provided on the injector 20, it is possible to block vibration of another cylinder, vibration of a valve operating mechanism, vibration of a head cover, etc. transmitted via the cylinder head 12, thus making it more difficult for them to be transmitted to the pressure detection element 34.

Furthermore, since the temperature of the extremity of the injector 20, through the interior of which fuel passes, is maintained at a low temperature compared with the temperature of the combustion chamber 14, it is possible to suppress overheating of the pressure detection element 34 provided thereon, thus enhancing the precision of pressure detection and the durability. In this arrangement, since the pressure detection element 34 faces the recess portion 14a forming part of the combustion chamber 14, it is possible to prevent flame of the combustion chamber 14 from acting directly on the pressure detection element 34, thus further enhancing the durability.

Furthermore, since the pressure detection element 34, which is formed into a ring shape, surrounds the periphery of the fuel injection hole 33b, not only is it possible to avoid interference with fuel injected from the fuel injection hole 33b, but it is also possible to maximize the size of the pressure detection element 34 and ensure that the area receiving in-cylinder pressure is maximized, thus enhancing the precision of pressure detection. Moreover, since the injector 20 is provided between the pair of intake valves 17 and 17, into which fresh air is introduced, it becomes possible to detect an in-cylinder pressure in the vicinity of the intake valves 17 and 17 and predict the occurrence of knocking with high precision.

Figure 6:
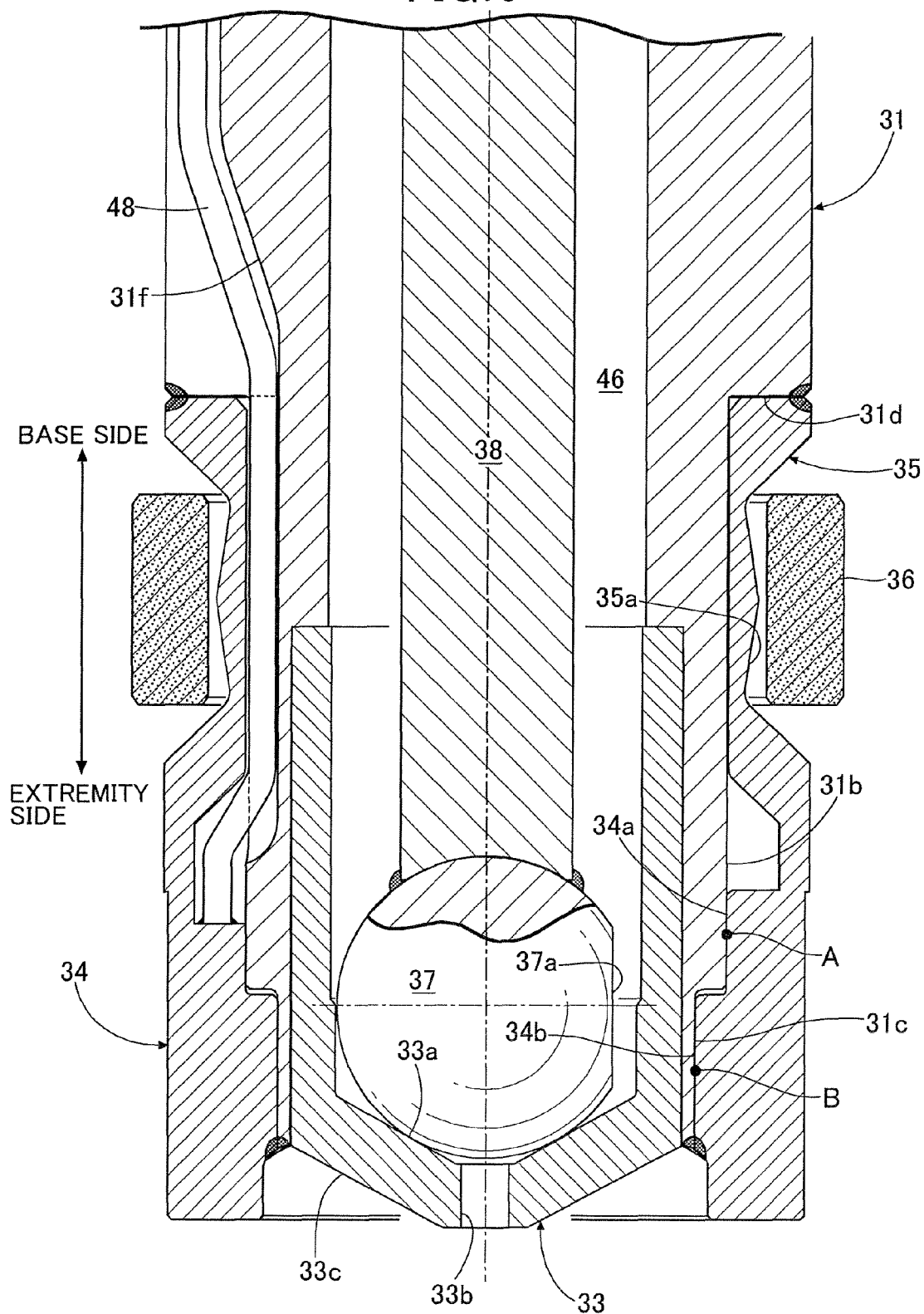
FIG. 6 is a view corresponding to FIG. 3. (second embodiment)

A second embodiment of the present invention is now explained by reference to FIG. 6.

Second Embodiment

In the first embodiment, the pressure detection element 34 and the collar structure 35 are formed from separate members, but in the second embodiment a pressure detection element 34 and a collar structure 35 are formed from one member. In accordance with the second embodiment, it becomes possible to reduce the number of components and simplify the structure.

Figure 7:
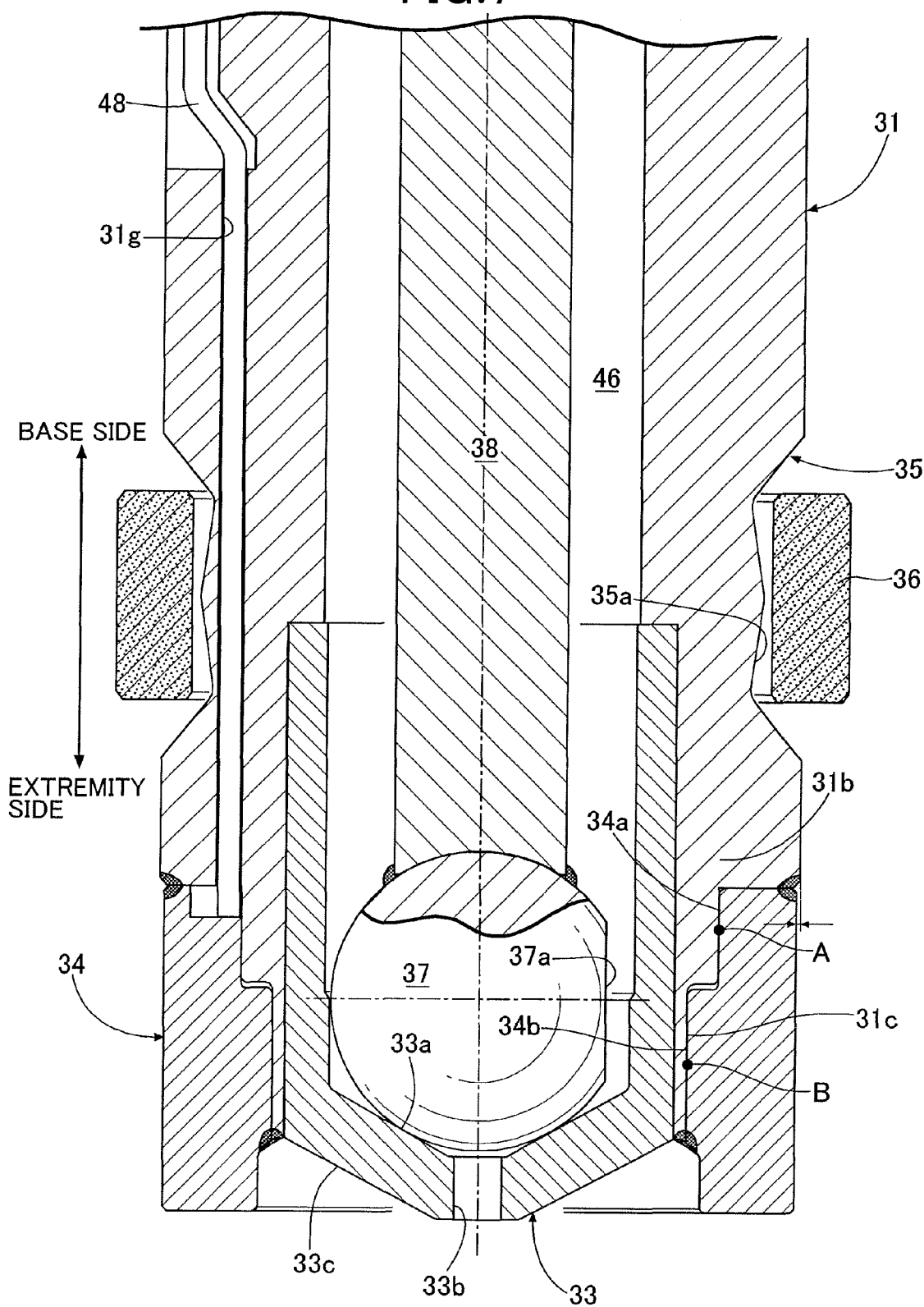
FIG. 7 is a view corresponding to FIG. 3. (third embodiment)

A third embodiment of the present invention is now explained by reference to FIG. 7.

Third Embodiment

In the first embodiment, the valve housing 31 and the collar structure 35 are formed from separate members, but in the third embodiment a collar structure 35 is formed integrally with a valve housing 31. Therefore, the pressure detection element housing groove 31f formed in the outer face of the valve housing 31 in the first embodiment is in the third embodiment formed from a tunnel-shaped output signal transmission member housing hole 31g extending through the interior of the valve housing 31 and the collar structure 35, which are formed as a unit. In accordance with the third embodiment, it becomes possible to reduce the number of components and simplify the structure.

Figure 8:
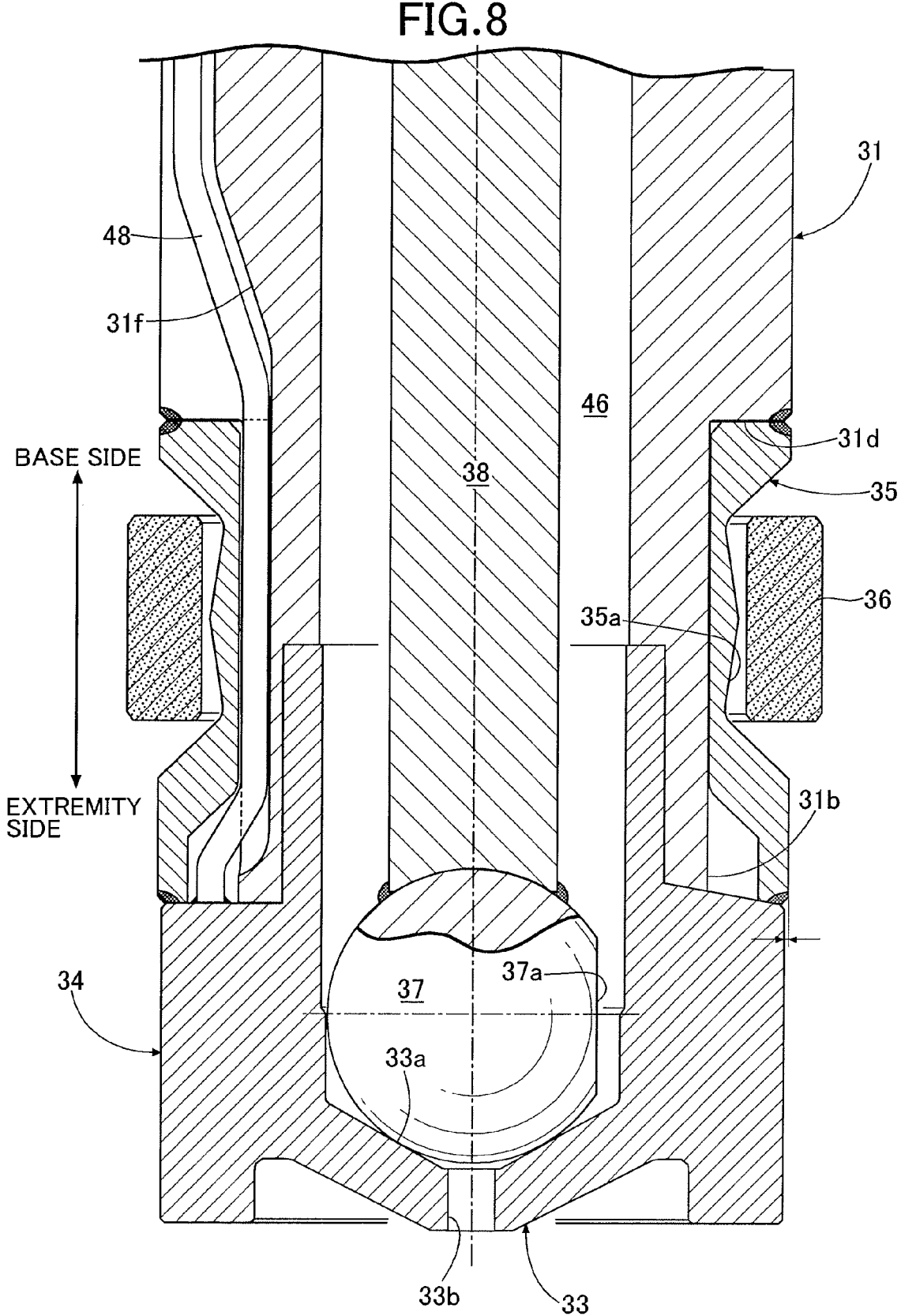
FIG. 8 is a view corresponding to FIG. 3. (fourth embodiment)

A fourth embodiment of the present invention is now explained by reference to FIG. 8.

Fourth Embodiment

In the first embodiment, the pressure detection element 34 and the valve seat member 33 are formed from separate members, but in the fourth embodiment a pressure detection element 34 and a valve seat member 33 are formed from one member. In accordance with the fourth embodiment, it becomes possible to reduce the number of components and simplify the structure.

Figure 9:
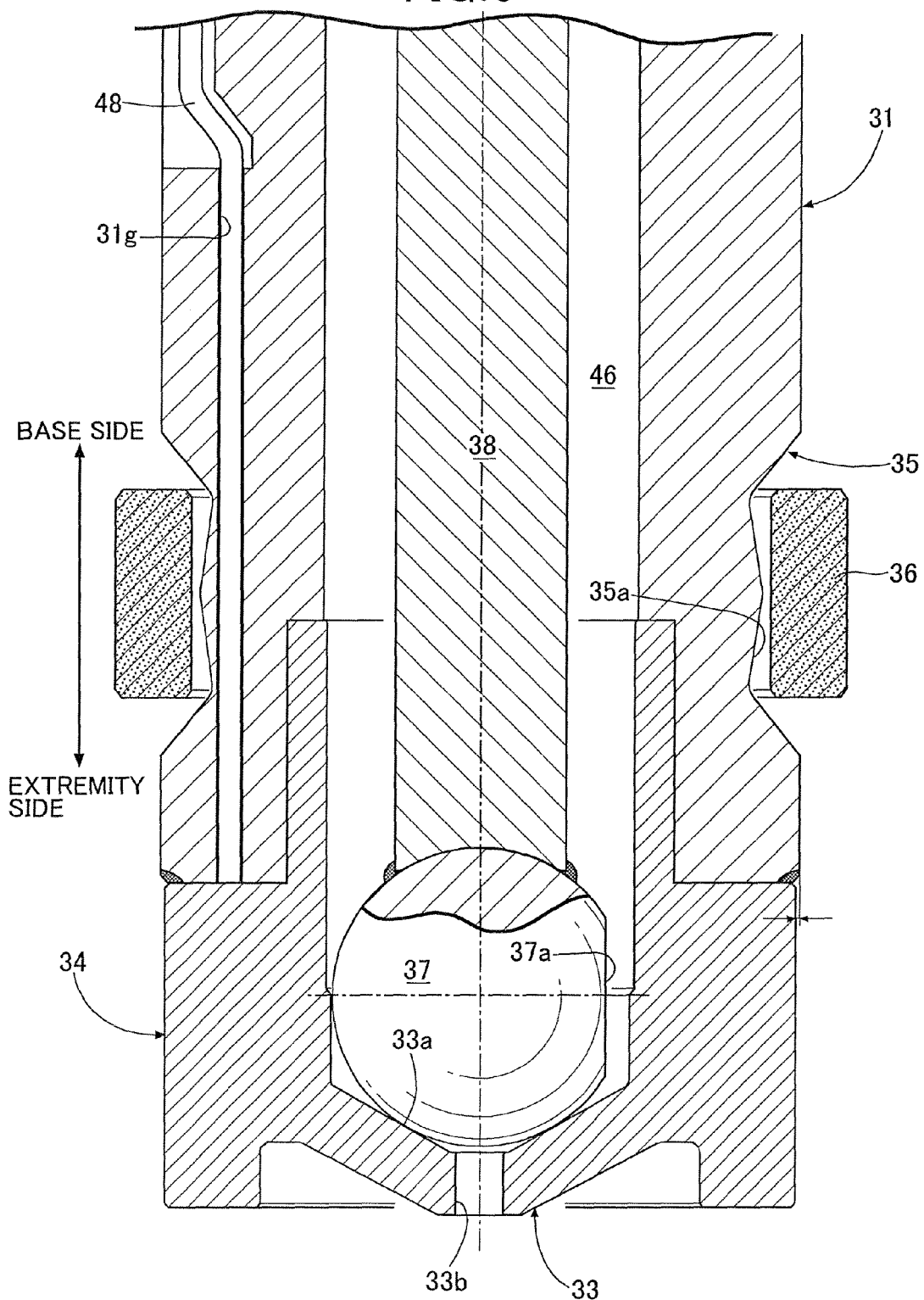
FIG. 9 is a view corresponding to FIG. 3. (fifth embodiment)

A fifth embodiment of the present invention is now explained by reference to FIG. 9.

Fifth Embodiment

The fifth embodiment is a modification of the third embodiment explained by reference to FIG. 7; a collar structure 35 is formed integrally with a valve housing 31, and a pressure detection element 34 and a valve seat member 33 are formed from one member. In accordance with the fifth embodiment, it becomes possible to further reduce the number of components and further simplify the structure.

Figure 10:
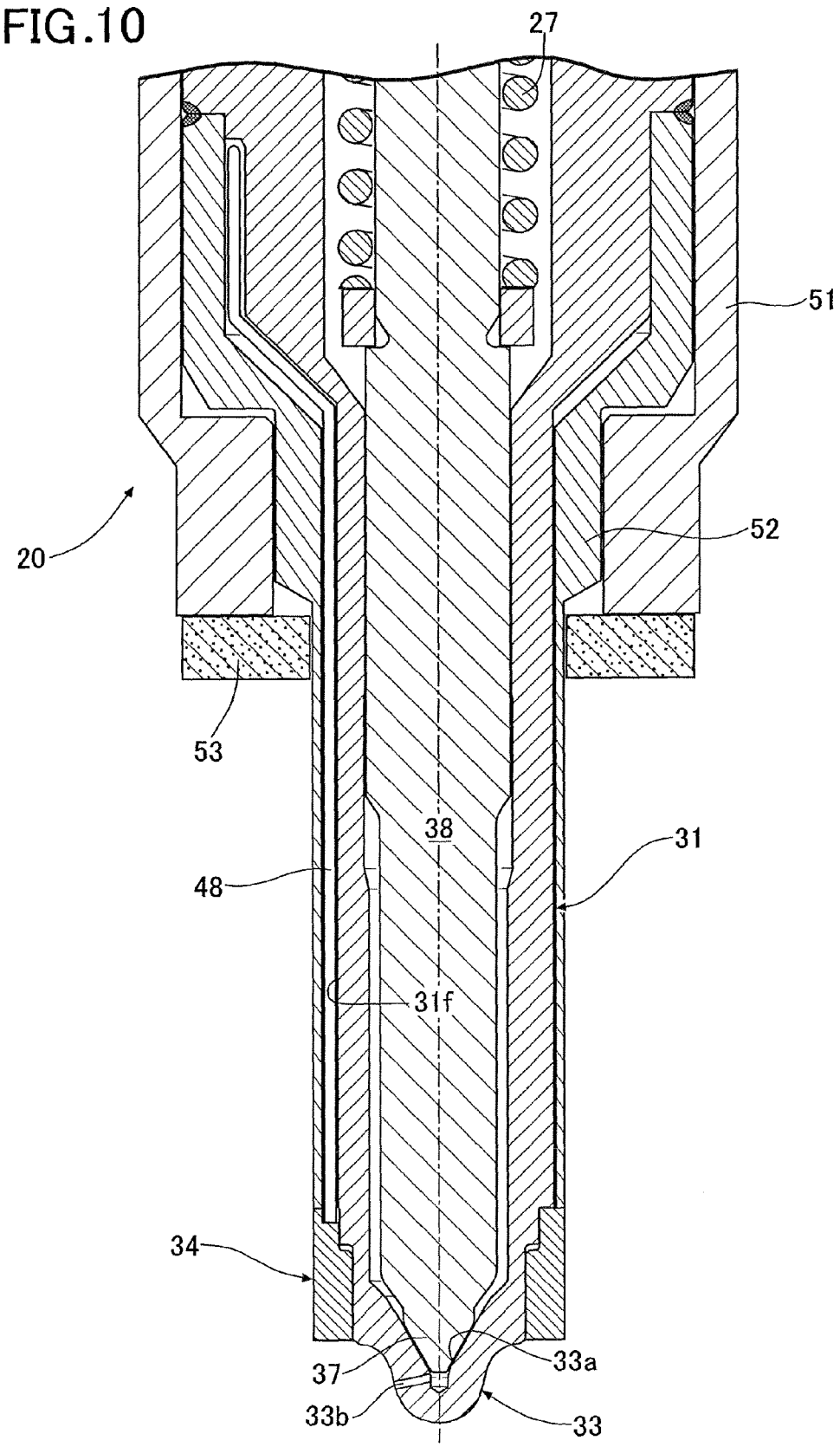
FIG. 10 is a view corresponding to FIG. 4. (sixth embodiment)

A sixth embodiment of the present invention is now explained by reference to FIG. 10.

Sixth Embodiment

The sixth embodiment shows an injector 20 for a diesel engine. The injector 20 includes a valve housing 31 fitted into the interiors of a tubular outer case 51 and a tubular body 52, and a valve seat member 33 having a valve seat 33a and fuel injection holes 33b is formed integrally with a lower part of the valve housing 31. A stem 38 integrally having at the lower end a valve body 37 that can be seated on the valve seat 33a is vertically movably disposed in the interior of the valve housing 31.

A ring-shaped pressure detection element 34 is disposed on the outer periphery in the vicinity of the extremity of the valve housing 31, and an output signal transmission member 48 extending from the pressure detection element 34 is housed between an inner face of the body 52 and an output signal transmission member housing groove 31f formed in an outer face of the valve housing 31. A gasket 53 surrounding the periphery of the body 52 is disposed at the extremity of the outer case 51, and this gasket 53 provides a seal against an injector mounting hole of a cylinder head. The distance from the gasket 53 to the extremity of the injector 20 is larger than the injector 20 for a gasoline engine explained in the first to fifth embodiments, and the fuel injection holes 33b can be disposed within a cavity formed in a top face of a piston of a diesel engine.

In accordance with the sixth embodiment, the same operational effects as those of the first embodiment described above can be achieved.

Figure 11:
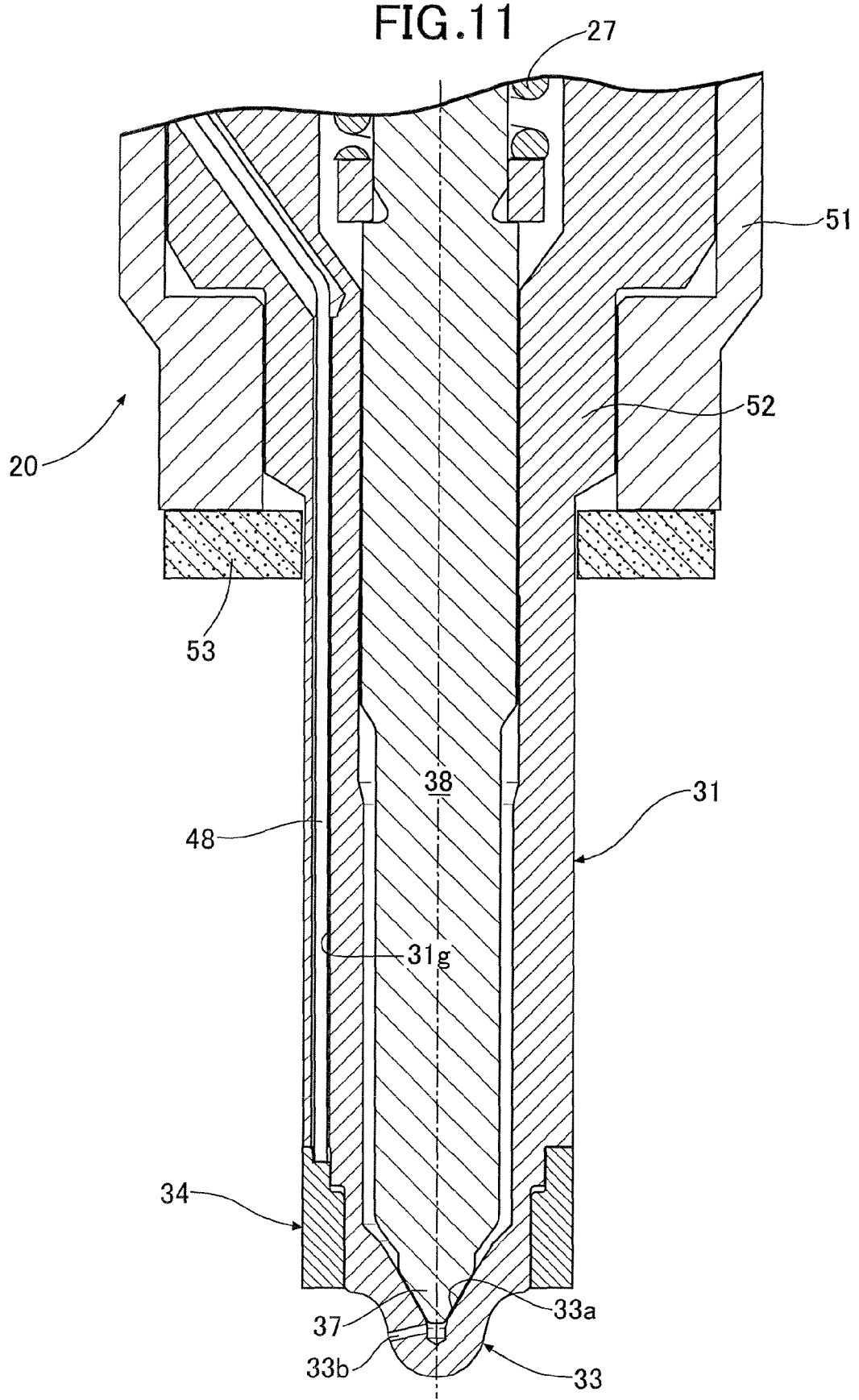
FIG. 11 is a view corresponding to FIG. 4. (seventh embodiment)

A seventh embodiment of the present invention is now explained by reference to FIG. 11.

Seventh Embodiment

In the sixth embodiment the valve housing 31 and the body 52 are formed from separate members, but in the seventh embodiment a valve housing 31 and a body 52 are formed from one member, and because of this an output signal transmission member 48 extending from a pressure detection element 34 is housed in a tunnel-shaped output signal transmission member housing hole 31g extending through the interior of the valve housing 31 and the body 52, which are formed as a unit. In accordance with the seventh embodiment, it becomes possible to reduce the number of components and simplify the structure.

Embodiments of the present invention are explained above, but the present invention may be modified in a variety of ways as long as the modifications do not depart from the spirit and scope thereof.

For example, in the embodiments the pressure detection element 34 is formed from a piezoelectric element, but a pressure detection element 34 can be formed from a strain gauge whose electrical resistance value changes according to strain.

The invention claimed is:

1. An in-cylinder pressure detecting device of a direct injection type internal combustion engine having a combustion chamber and an injector, the injector having an extremity and a base end on opposite ends thereof, and the extremity of the injector facing the combustion chamber, the in-cylinder pressure detecting device comprising:
 a pressure detection element surrounding a fuel injection hole formed in a valve seat member of the injector that injects fuel via the fuel injection hole into the combustion chamber, the pressure detection element having an extremity capable of being compressed in an axial direction of the injector,
 wherein the valve seat member is disposed on an inner periphery of an extremity of the injector,
 wherein the pressure detection element is provided in the vicinity of the extremity of the injector and outside of an outermost periphery of the valve seat member such that the pressure detection element faces the combustion chamber, and
 wherein the pressure detection element is provided at a position closer to the extremity of the injector than a seal member that prevents a passage of combustion gas between an outer periphery of the injector and an inner periphery of an injector mounting hole of a cylinder head.

2. The in-cylinder pressure detecting device of a direct injection type internal combustion engine according to claim 1, wherein an output signal transmission member extending from the pressure detection element is disposed between an outer face of the injector and an inner face of the seal member.

3. The in-cylinder pressure detecting device of a direct injection type internal combustion engine according to claim 2, wherein a collar structure that supports the seal member is provided in the vicinity of the extremity of the injector, and the collar structure is positioned between the seal member and the output signal transmission member.

4. The in-cylinder pressure detecting device of a direct injection type internal combustion engine according to claim 3, wherein an external diameter of the collar structure is larger than an external diameter of the pressure detection element.

5. The in-cylinder pressure detecting device of a direct injection type internal combustion engine according to claim 3 or claim 4, wherein an output signal transmission member housing groove, in which the output signal transmission member is disposed, is formed in the outer face of the injector.

6. The in-cylinder pressure detecting device of a direct injection type internal combustion engine according to claim 1, wherein the seal member is provided in an annular groove formed in the vicinity of the extremity of the injector, and an output signal transmission member extending from the pressure detection element is disposed in an interior of the injector.

7. The in-cylinder pressure detecting device of a direct injection type internal combustion engine according to claim 6, wherein an output signal transmission member housing hole, in which the output signal transmission member is disposed, is formed in the interior of the injector.

8. The in-cylinder pressure detecting device of a direct injection type internal combustion engine according to claim 1, wherein a welding margin, with which the pressure detection element is integrally welded, is provided in the vicinity of the extremity of the injector.

9. The in-cylinder pressure detecting device of a direct injection type internal combustion engine according to claim 8, wherein the welding margin is sandwiched between the pressure detection element and the valve seat member, the welding margin being formed from a material having higher weldability than that of the valve seat member.

10. The in-cylinder pressure detecting device of a direct injection type internal combustion engine according to claim 1, wherein a base end of the pressure detection element is an interference fit with the vicinity of the extremity of the injector, and the extremity of the pressure detection element is a clearance fit therewith.

11. The in-cylinder pressure detecting device of a direct injection type internal combustion engine according to claim 1, wherein the pressure detection element is formed integrally with the valve seat member.

12. The in-cylinder pressure detecting device of a direct injection type internal combustion engine according to claim 1, wherein the seal member comprises a gasket provided on an intermediate part in the axial direction of the injector.

13. The in-cylinder pressure detecting device of a direct injection type internal combustion engine according to claim 12, wherein an output signal transmission member extending from the pressure detection element is disposed in an interior of the injector.

14. The in-cylinder pressure detecting device of a direct injection type internal combustion engine according to claim 12, wherein an output signal transmission member extending from the pressure detection element is disposed between an inner face of the gasket and the outer face of the injector.

15. The in-cylinder pressure detecting device of a direct injection type internal combustion engine according to claim 1, wherein the pressure detection element is disposed at a most tip end of the injector.

\* \* \* \* \*